US012268348B2

(12) United States Patent
Kim

(10) Patent No.: US 12,268,348 B2
(45) Date of Patent: Apr. 8, 2025

(54) DISHWASHER

(71) Applicant: LG Electronics Inc., Seoul (KR)

(72) Inventor: Sangik Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 17/792,949

(22) PCT Filed: Jan. 20, 2020

(86) PCT No.: PCT/KR2020/000963
§ 371 (c)(1),
(2) Date: Jul. 14, 2022

(87) PCT Pub. No.: WO2021/145495
PCT Pub. Date: Jul. 22, 2021

(65) Prior Publication Data

US 2023/0047148 A1 Feb. 16, 2023

(30) Foreign Application Priority Data

Jan. 14, 2020 (KR) ........................ 10-2020-0004986

(51) Int. Cl.
*A47L 15/42* (2006.01)
*F21V 33/00* (2006.01)

(52) U.S. Cl.
CPC ....... *A47L 15/4293* (2013.01); *A47L 15/4251* (2013.01); *A47L 15/4257* (2013.01);
(Continued)

(58) Field of Classification Search
None
See application file for complete search history.

(56) References Cited

U.S. PATENT DOCUMENTS

2012/0320345 A1* 12/2012 Kleinert .................. D06F 34/32
353/101

FOREIGN PATENT DOCUMENTS

EP 0691100 1/1996
EP 1421893 3/2005
(Continued)

OTHER PUBLICATIONS

International Search Report in International Appln. No. PCT/KR2020/000963, dated Sep. 28, 2020, 6 pages (with English translation).
(Continued)

*Primary Examiner* — Levon J Shahinian
(74) *Attorney, Agent, or Firm* — Fish & Richardson P.C.

(57) ABSTRACT

The present invention relates to a dishwasher. The dishwasher of the present invention comprises: a tub open at one side thereof and forming a space in which dishes are washed; a base disposed under the tub and spacing the tub a predetermined distance apart from the bottom surface; a door opening/closing the open side of the tub; a lower cover extending forward from the front end of the base and covering the lower side of the tub; and a light source part disposed above the lower cover to emit light, wherein the light source part comprises a lamp which emits light and a housing by which the lamp is fixedly placed while being spaced a predetermined distance upward apart from the lower cover, and the lower cover has a light source hole formed therethrough, the light source hole being open in the vertical direction below the lamp.

20 Claims, 15 Drawing Sheets

(52) U.S. Cl.
CPC ...... *A47L 15/4265* (2013.01); *F21V 33/0044* (2013.01); *A47L 2501/26* (2013.01)

(56) References Cited

FOREIGN PATENT DOCUMENTS

| | | |
|---|---|---|
| EP | 2363055 | 9/2011 |
| EP | 2850989 | 3/2015 |
| JP | H07213471 | 8/1995 |
| JP | 2010069192 | 4/2010 |
| KR | 20170082406 | 7/2017 |

OTHER PUBLICATIONS

Extended European Search Report in European Appln. No. 20914730.5, mailed on Dec. 21, 2023, 8 pages.

* cited by examiner

DISHWASHER

CROSS-REFERENCE TO RELATED APPLICATIONS

This application is a National Stage application under 35 U.S.C. § 371 of International Application No. PCT/KR2020/000963, filed on Jan. 20, 2020, which claims the benefit of Korean Patent Application No. 10-2020-0004986, filed on Jan. 14, 2020. The disclosures of the prior applications are incorporated by reference in their entirety.

TECHNICAL FIELD

The present disclosure relates to a dishwasher, and more particularly, to a dishwasher including a lamp that indicates the operation status of the dishwasher.

BACKGROUND ART

A dishwasher is a home appliance used to clean contaminants, such as food residue, on dishware, cookware, and the like (hereinafter referred to as an object to be washed) by using high-pressure washing water sprayed from a spray arm.

Recently, there is an increasing number of households with a built-in dishwasher for kitchen space-saving purposes. However, in the case of a built-in dishwasher, the dishwasher is exposed only through the door, making it difficult for a user to visually determine whether the dishwasher is operating.

European Patent EP 1421893 B1, which is hereby incorporated by reference, discloses a configuration for projecting light onto a lower space of a door of a dishwasher. In the case of a built-in dishwasher, as a cover panel that is disposed at the front of a door moves to a lower space of the door, a light-emitting unit configured to emit light limits a range of rotation of the cover panel.

When light is emitted to the lower space of the door, which is an area difficult to keep clean and maintain, it may cause unpleasantness for a user.

DISCLOSURE OF INVENTION

Technical Problem

It is an objective of the present disclosure to provide a dishwasher that can inform a user of the operation status of the dishwasher while securing a range of rotation of a cover panel.

It is another objective of the present disclosure to provide a dishwasher that can emit light in a limited range of area when illuminating an area that is difficult to keep clean and maintain.

It is yet another objective of the present disclosure to provide a dishwasher that can maximize the lifespan of a light source that provides a notification to a user.

The objectives of the present disclosure are not limited to the objectives described above, and other objectives not stated herein will be clearly understood by those skilled in the art from the following description.

Technical Solution

According to an aspect of the subject matter described in this application, a dishwasher includes: a tub defining a space in which dishes are washed and having one open side; a base disposed on a lower side of the tub and by which the tub is spaced apart from a floor surface by a predetermined interval; a door opening and closing the one open side of the tub; a lower cover extending forward from a front end of the base and covering the lower side of the tub; and a light source disposed on the lower cover and emitting light, allowing an operation status of the dishwasher to be informed through the light source.

The light source may include a lamp configured to emit light, and a housing in which the lamp is fixedly disposed in a manner of being spaced upward from the lower cover by a predetermined interval. The lower cover may be provided with a light source hole vertically open at a lower side of the lamp. Accordingly, the light source disposed inside the lower cover may emit, through a plurality of holes, light to a floor under the lower cover.

The light source may include a plurality of lamps that are spaced apart from one another at predetermined intervals and emit light.

The lower cover may be provided with a plurality of light source holes formed under the plurality of lamps, and the plurality of light source holes may be disposed under the plurality of lamps, respectively, so as to correspond to the plurality of lamps. Accordingly, light may be emitted to a lower side of the lower cover through the plurality of light source holes that respectively correspond to the plurality of lamps.

The dishwasher may further include a cover panel that covers one side of the door and one side of the base, and is movably disposed on the door. The light source may emit light to a space between the cover panel and the base, allowing the light to be emitted to a floor space at the rear of the cover panel.

A separation distance between the plurality of light source holes may be set to allow light emitted from the plurality of lamps to only pass through the respective corresponding plurality of light source holes, allowing the light emitted from the light source to illuminate a partial area of a space under the door.

A separation distance between the plurality of lamps may be greater than a separation distance between each of the plurality of lamps and each of the plurality of light source holes. More specifically, the separation distance between the plurality of lamps may be three times greater than the separation distance between each of the plurality of lamps and each of the plurality of light source holes, thereby preventing light emitted from the plurality of lamps from being emitted to other light holes other than the respective corresponding holes.

A length of each of the plurality of lamps in a left-and-right direction may be greater than a length of each of the plurality of light source holes in the left-and-right direction, thereby preventing light generated by the lamp from being widely diffused in left-and-right direction.

The light source may further include a printed circuit board on which the lamp is mounted, the printed circuit board being configured to control an operation of the lamp. The housing may be provided with a rib that allows the printed circuit board to be spaced apart therefrom by a predetermined interval, allowing the lamp to be upwardly spaced from the lower cover.

The housing may be made of a transparent material, so that light generated by the lamp may pass though the housing and then be emitted to the lower side of the lower cover.

With the printed circuit board mounted to an inner space of the housing, silicone may be molded to cover an upper side of the printed circuit board, thereby preventing moisture from being introduced into the printed circuit board.

The light source may further include an indicator lamp that is disposed on the printed circuit board and configured to emit light of a different color from the lamp, allowing a user to be informed of a malfunction or failure of the dishwasher as well as an operation status of the dishwasher.

The indicator lamp may be provided in plurality, and the plurality of indicator lamps may be respectively disposed at front sides of the plurality of lamps, allowing different areas from the plurality of lamps may be illuminated.

A length of the light source hole in a front-and-rear direction may be less than or equal to a distance from a front end of the indicator lamp to a rear end of the lamp.

Details of other embodiments are included in the detailed description and the accompanying drawings.

Advantageous Effects

A dishwasher according to the present disclosure has one or more of the following effects.

First, as a light source is disposed on a lower cover to allow light to be emitted to a lower side of the lower cover, a range of rotation of a cover panel may be secured while informing a user of the operation status of the dishwasher.

Second, as light, which is emitted from each of a plurality of lamps, is emitted only through light source holes disposed under the plurality of lamps, respectively, the light may be emitted only to a limited area of the lower cover. Accordingly, light may be emitted only to a limited area without illuminating the entire area that a user wants to avoid its exposure.

In addition, as beams of light emitted from the plurality of lamps partially overlap each other on a floor, light effects such as dimming lighting technology may be provided.

Third, as the light source is disposed on the lower cover, and the lower cover has a convex-upward groove structure in a region where the light source and the lower cover are coupled to each other, the rotation of the lower cover may not be affected. In addition, silicone is molded onto and around a printed circuit board disposed in a housing, contact with external moisture may be minimized to thereby achieve the lifespan of the light source.

Further, as the light source holes are provided to correspond to the plurality of lamps, the hole area may be reduced compared when a single large hole is drilled, thereby reducing a possibility of inflow of foreign matter.

The effects of the present disclosure are not limited to the effects described above, and other effects not mentioned will be clearly understood by those skilled in the art from the claims.

MODE FOR INVENTION

Figure 1:
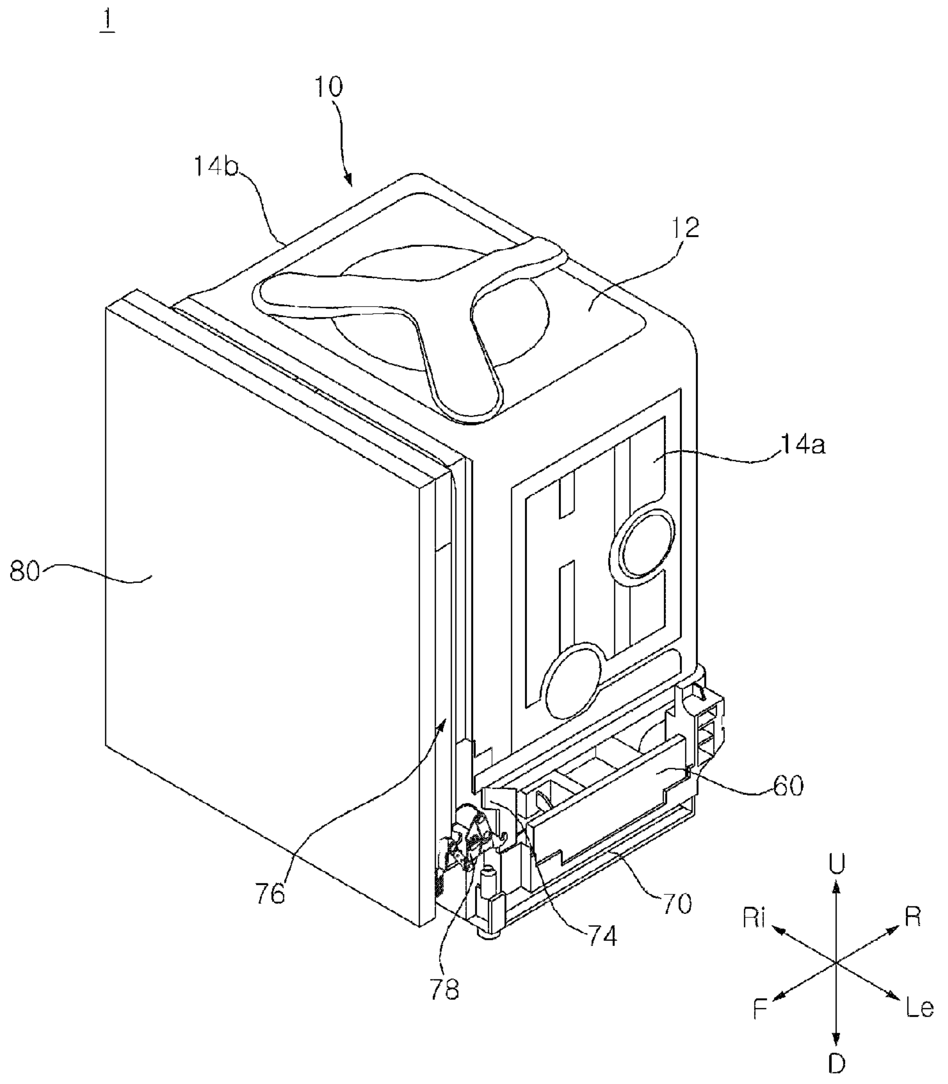
FIG. 1 is a perspective view of a dishwasher according to an embodiment of the present disclosure.
Figure 2:
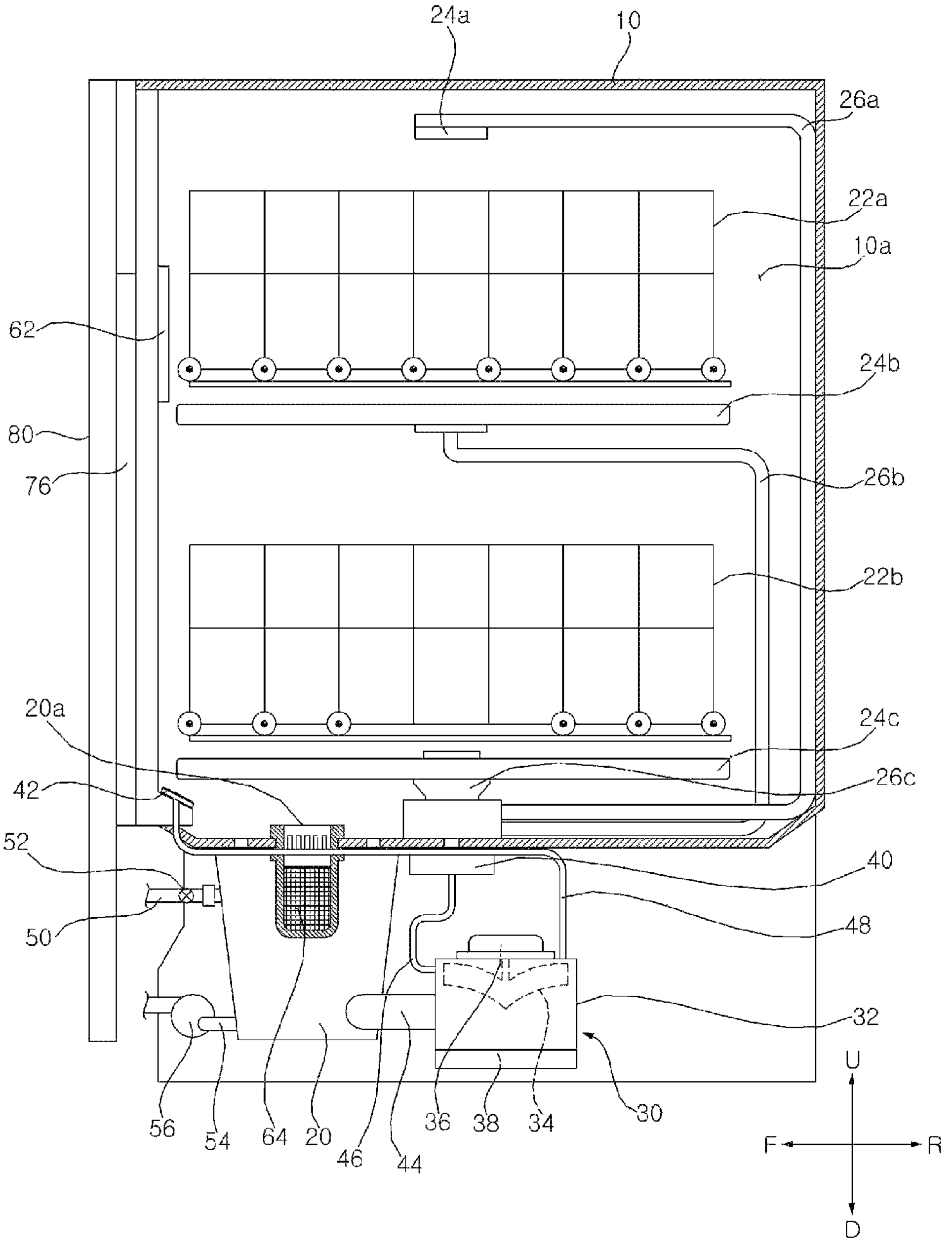
FIG. 2 is a schematic cross-sectional view of a dishwasher according to an embodiment of the present disclosure.

The above and other aspects, features and other advantages of the present disclosure will be more clearly understood from the following detailed description taken in conjunction with the accompanying drawings. Exemplary embodiments will now be described more fully hereinafter with reference to the accompanying drawings; however, they may be embodied in many different forms and should not be construed as limited to the embodiments set forth herein. Rather, these embodiments are provided so that this disclosure will be thorough and complete, and will fully convey the scope of the exemplary embodiments to those skilled in the art. The same reference numerals are used throughout the drawings to designate the same or similar components.

The directions “up (U)”, “down (D)”, “Left (Le)”, “right (Ri)”, “front (F)”, and “rear (R)” in FIGS. 1 to 11 are defined as shown in the drawings. However, this is only for the purpose of clarity of explanation, and therefore, these directions may be defined differently depending on a reference or a basis.

Hereinafter, the present disclosure will be described with reference to the drawings for explaining a dishwasher according to embodiments of the present disclosure.

<Overall Configuration>

Hereinafter, the overall configuration of a dishwasher 1 according to an embodiment of the present disclosure will be described with reference to FIGS. 1 to 6, and FIG. 8.

Referring to FIG. 1, the dishwasher 1 according to this embodiment may be used as a built-in dishwasher in a space such as a kitchen. Accordingly, the dishwasher 1 according to this embodiment may not include a separate case for covering an outside of a tub 10. However, in some embodiments, a case (not shown) that defines an outer shape or appearance may be provided. The following description will be made based on the dishwasher according to FIG. 1, however, the relationship among a link module 82, a door 76, and a cover panel 80, which are described hereinafter, may also be applied to a dishwasher equipped with a case.

The dishwasher 1 according to this embodiment includes the tub 10 that defines a washing chamber 10*a* therein and has an open front surface, a base 70 that is disposed on a lower side of the tub 10 and allows the tub 10 to be spaced apart from a bottom or floor surface by a predetermined distance or interval, a sump 20 that is disposed on the lower side of the tub 10 and temporarily stores washing water to be supplied to the tub 10, the door 76 rotatably connected to a lower end of the tub 10 to open and close the open front surface of the tub 10, the cover panel 80 that covers the door 76 and the base 70 and is movably disposed on the door 76, and the link module 82 configured to move the cover panel 80 in a longitudinal direction of the door when the door 76 rotates.

The dishwasher 1 according to this embodiment may further include a rack 22*a* and a rack 22*b* disposed in the washing chamber 10*a* and on which dishes to be washed are placed, a plurality of spray nozzles 24*a*, 24*b*, and 24*c* spraying washing water to the washing chamber 10*a*, a washing pump 30 that is disposed under the tub 10 and pumps washing water stored in the sump 20 to the plurality of spray nozzles 24*a*, 24*b*, and 24*c*, a selector valve 40 that allows washing water pumped by the washing pump 30 to be transferred to at least one of the plurality of spray nozzles 24*a*, 24*b* and 24*c*, and a plurality of connecting pipes 26*a*, 26*b*, and 26*c* through which the selector valve 40 and the respective plurality of spray nozzles 24*a*, 24*b*, and 24*c* are connected.

The washing pump 30 may rotate an impeller 34 disposed in a washing pump housing 32 by using a washing motor 36, and may supply washing water stored in the sump 20 to the tub 10. The washing pump 30 may further include a heater 38 that heats washing water inside the washing pump housing 32. The heater 38 may generate steam by heating washing water in the washing pump 30.

The dishwasher 1 according to this embodiment may further include a steam nozzle 42 that delivers steam generated by the heater 38 into the tub 10. The dishwasher 1 according to this embodiment may include a washing pump inlet pipe 44 that connects the sump 20 and the washing pump 30, a washing pump discharge pipe 46 that connects the washing pump 30 and the selector valve 40, and a steam discharge pipe 48 that connects the washing pump 30 and the steam nozzle 42.

A filter 64 that filters foreign substances from washing water introduced from the tub 10 may be disposed at the sump 20. The dishwasher 1 according to this embodiment may include a water supply pipe 50 that supplies washing water to the sump 20, a water supply valve 52 that opens and closes the water supply pipe 50, a drain pipe 54 that discharges washing water of the sump 20 to the outside, and a drain pump 56.

The tub 10 may have a box shape with an open front surface. The lower side of the tub 10 may be connected to the sump 20. A sump hole 20*a* may be formed in the tub 10, and a lower side of the sump hole 20*a* may be connected to the sump 20. The plurality of racks 22*a* and 22*b* may be disposed at the washing chamber 10*a* defined in the tub 10.

The plurality of spray nozzles 24*a*, 24*b*, and 24*c* are disposed at the washing chamber 10*a* defined in the tub 10. The plurality of spray nozzles 24*a*, 24*b*, and 24*c* may spray washing water toward inner surfaces of the rack 22*a* and the rack 22*b*, or an inner surface of the tub 10.

In order to reinforce the strength of the tub 10, a tub frame 16 may be disposed on a front side of the tub 10. The tub frame 16 may be fastened to the tub 10 at an upper surface 12 and both side surfaces 14*a* and 14*b* of the tub 10.

A front lower end of the tub 10 is rotatably connected to the door 76. The tub 10 may be hingedly connected to the door 76. That is, the door 76 may rotate with respect to a door rotating shaft 94 disposed at the front lower end of the tub 10.

The base 70 is disposed on the lower side of the tub 10 to thereby support the tub 10. The base 70 may allow the tub 10 to be spaced apart from the floor surface by a predetermined interval, and may define a space in which the sump 20 and the washing pump 30 are disposed. The base 70 may be provided therein with a control box 60 in which a printed circuit board (not shown) that controls the operation of the washing pump 30 and the like is accommodated.

A front end 72 of the base 70 may be disposed more rearward than a front end 15 of the tub 10 in a spaced manner. The base 70 is disposed more rearward than the tub 10 so as not to interfere with movement of the cover panel 80 when the cover panel 80 moves as the door 76 rotates.

In consideration of the movement of the cover panel 80, the front end 72 of the base 70 may have a shape that is inclined rearward from a lower side to an upper side thereof.

Figure 6:
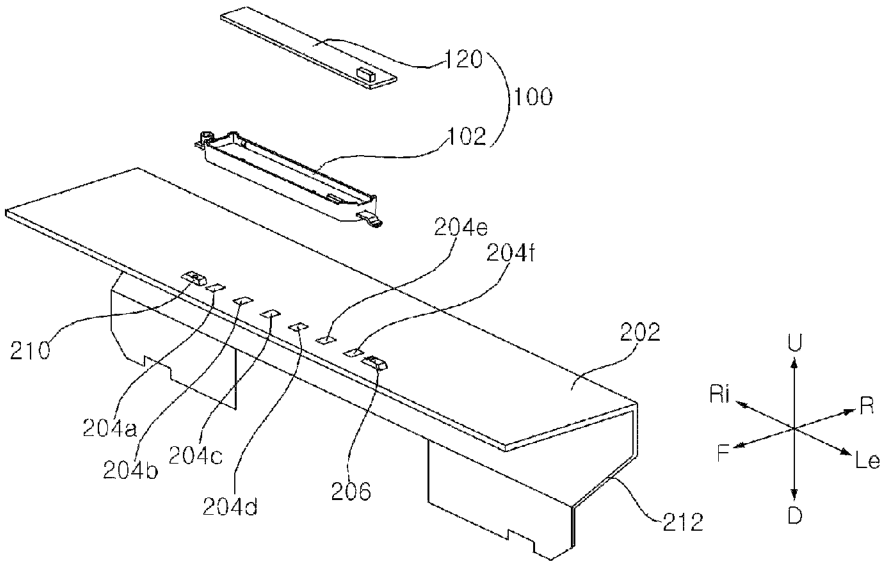
FIG. 6 is a disassembled perspective view of a lower cover, a housing of a light source, and a printed circuit board, according to an embodiment of the present disclosure.

The dishwasher includes a lower cover 200 extending forward from the front end 72 of the base 70 and covering the lower side of the tub 10. Referring to FIG. 6, the lower cover 200 may be formed separately from the base 70. Alternatively, unlike as shown in FIG. 6, the lower cover 200 may be integrally formed with the base 70.

Figure 5:
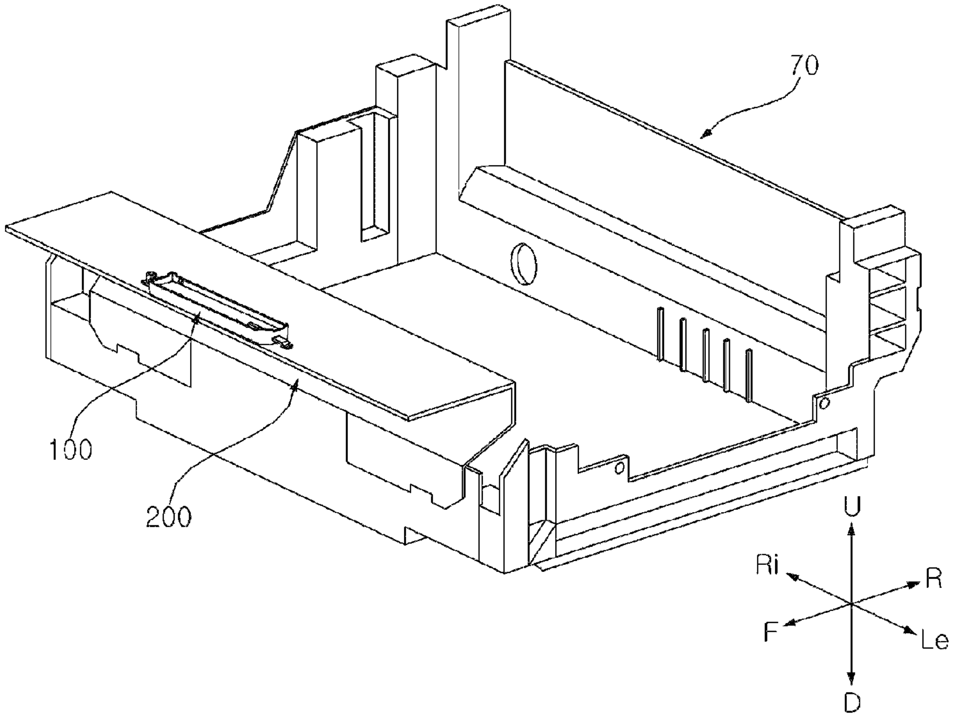
FIG. 5 is a perspective view illustrating a coupled state of a base, a lower cover, and a light source, according to an embodiment of the present disclosure.

Referring to FIG. 5, the lower cover 200 is disposed to protrude forward from the base 70. A space that allows the cover panel 80 to rotate is formed at the front of the base 70 of the lower cover 200 and the lower side of the tub 10.

The lower cover 200 may allow the cover panel 80 to be spaced forward from the front end 72 of the base 70. The lower cover 200 includes a base connecting portion 212 that is connected to the base 70 and a horizontal extension portion 202 that is bent vertically from an upper end of the base connection portion 212 and extends forward.

A light source part or a light source 100 described hereinafter is disposed at the lower cover 200. The light source 100 is fixedly disposed on the lower cover 200. The light source 100 is mounted on the lower cover 200 in an opposite direction of the space in which the cover panel 80 rotates. A plurality of light source holes 204*a*, 204*b*, 204*c*, 204*d*, 204*e*, and 204*f* through which light generated from the light source 100 is emitted to the outside are formed in the lower cover 200.

Figure 8:
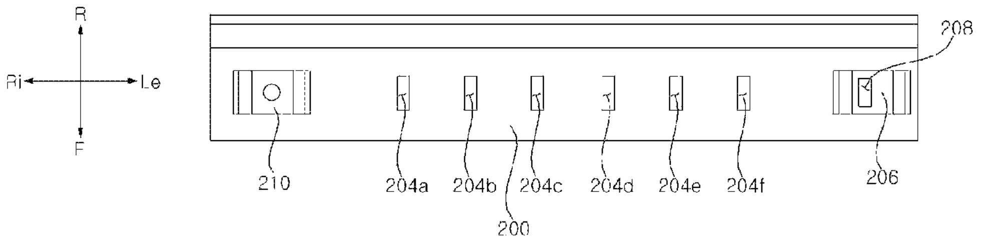
FIG. 8 is a plan view illustrating a portion of a lower cover on which a light source is mounted, according to an embodiment of the present disclosure.

Referring to FIG. 8, the plurality of light source holes 204*a*, 204*b*, 204*c*, 204*d*, 204*e*, and 204*f* that are spaced apart from one another in the left-and-right direction are formed in the lower cover 200. The plurality of light source holes 204*a*, 204*b*, 204*c*, 204*d*, 204*e*, and 204*f* are provided in a number corresponding to the number of plurality of lamps 122*a*, 122*b*, 122*c*, 122*d*, 122*e*, and 122*f* of the light source 100 to be described hereinafter. A size of a region or area in which the plurality of light source holes 204*a*, 204*b*, 204*c*, 204*d*, 204*e*, and 204*f* are disposed may be one-third (⅓) or less than a length of the lower cover 200 that extends in the left-and-right direction.

Referring to FIG. 8, a first fixing part 206 and a second fixing part 210 to which the light source 100 is mounted and fixed are disposed on the lower cover 200. The lower cover 200 includes the first fixing part 206 to which a mounting part 108 of a housing 102 described hereinafter is mounted, and a second fixing part 210 to which a fastening part 112 of the housing 102 is fastened.

The first fixing part 206 and the second fixing part 210 are disposed at opposite ends of the plurality of light source holes 204*a*, 204*b*, 204*c*, 204*d*, 204*e*, and 204*f*. The first fixing part 206 and the second fixing part 210 protrude upward from the lower cover 200. The first fixing part 206 defines a first recess 206*a* upwardly formed at a lower surface of the lower cover 200. The second fixing part 210 defines a second recess 210*a* upwardly formed at the lower surface of the lower cover 200.

One side of the light source 100 is inserted into the first fixing part 206 to be fixed. An insertion hole 208 into which the mounting part 108 of the light source 100 is inserted is formed in the first fixing part 206. The one side of the light source 100 may be inserted into the insertion hole 208 to be disposed at the first recess 206*a*.

Another side of the light source 100 is fixed to the second fixing part 210 by a separate fastening member 126. The fastening member 126 may be disposed at the second recess 210*a* defined by the second fixing part 210.

That is, although the light source 100 is fixedly disposed at the first fixing part 206 and the second fixing part 210, a lower side of the lower cover 200 may define a flat surface, and thus, a range of rotation of the cover panel 80 is not limited.

The tub 10 may be fastened to the base 70, and may be fixed to an upper side of the base 70. The tub 10 and the base 70 may be fastened to each other by a separate fastening member (not shown). Also, the tub 10 may be coupled to the base 70 through a tub bracket 74. The tub 10 and the base 70 may be fastened to each other by the separate fastening member at the rear, and may be fastened to each other by the tub bracket 74 at the front.

Figure 3:
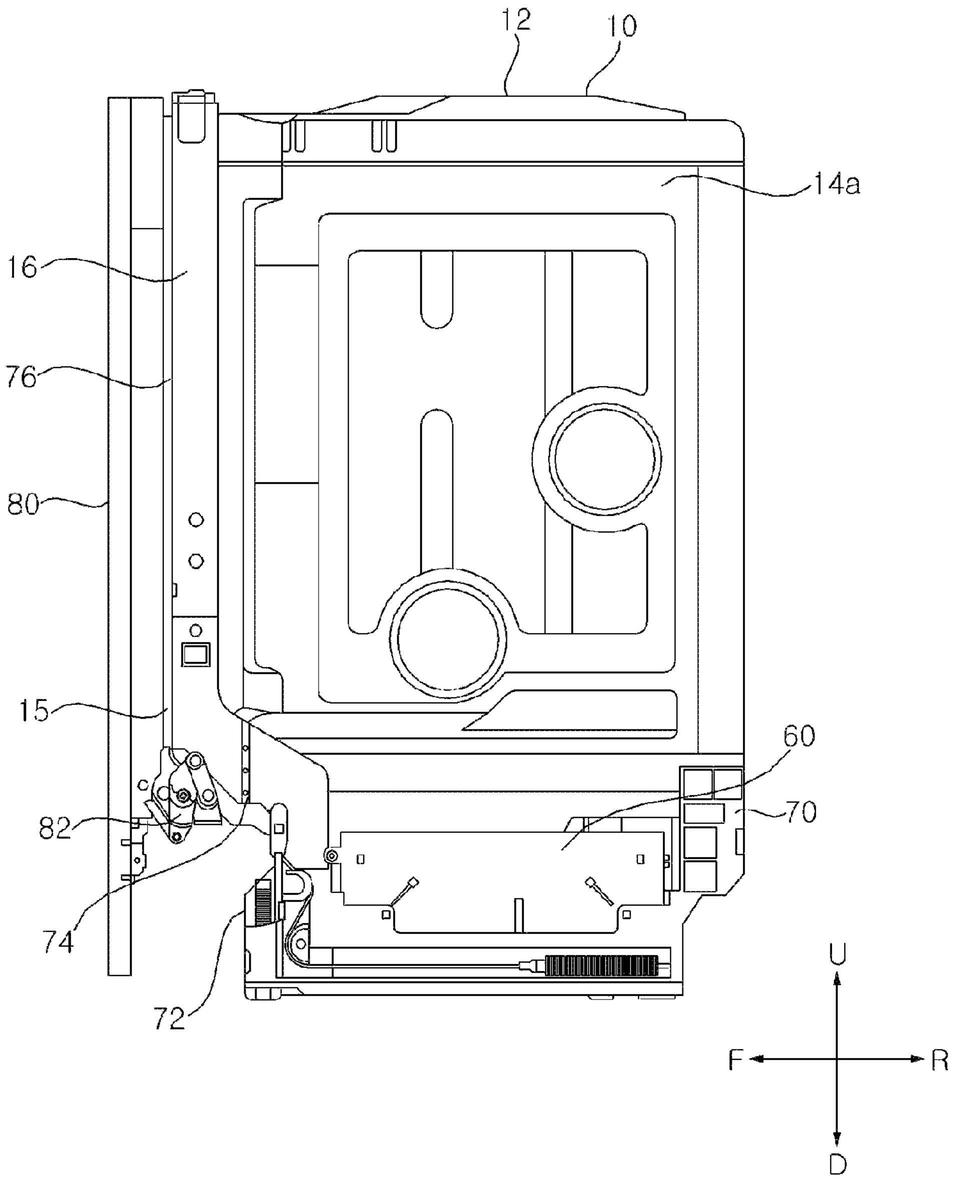
FIG. 3 is a side view of a dishwasher according to an embodiment of the present disclosure.

The dishwasher 1 may further include the tub bracket 74 that is fixedly disposed at a lower portion of the tub 10 and rotatably connected to the door 76, and a door bracket 160 that is fixedly disposed at the door 76 and rotatably connected to the tub 10. Referring to FIGS. 3 to 4C, the tub bracket 74 and the door bracket 160 are disposed in one direction of the tub 10 and the door 76, however, the tub bracket 74 and the door bracket 160 may also be disposed in an opposite or another direction of the tub 10 and the door 7, and may perform the same function.

The tub 10 and the base 70 may be fastened by the tub bracket 74. The tub bracket 74 may allow the tub 10 to be fixed to the upper side of the base 70, and may allow the door 76 to be disposed to be rotatable toward the front of the tub 10.

The door 76 may be rotatably disposed at the tub bracket 74 that is fastened to the tub 10. More specifically, the door 76 is rotatably disposed at the tub bracket 74 according to this embodiment.

The link module 82 allows the cover panel 80 that is disposed at the front of the door 76 to move in the longitudinal direction of the door 76 when the door 76 rotates. The link module 82 uses a rotational force of the door 76 to cause the cover panel 80 to move linearly.

The link module 82 may be provided in pair to be disposed at both side surfaces of the door, respectively. The link module 82 includes a first link module 82 disposed on a right side of the door 76 and a second link module (not shown) disposed on a left side of the door 76. The first link module 82 and the second link module with the same configuration and function are disposed on the left and right sides of the door.

Referring to FIGS. 3 to 4C, the link module 82 disposed in one direction of the tub 10 and the door 76 is described, but the link module 82 is also disposed in an opposite or another direction of the tub 10 and the door 76 and performs the same function.

The link module 82 may include a first link 84 rotatably connected to the door bracket 160, a second link 86 rotatably connected to the tub bracket 74 and the first link 84, and a third link 88 rotatably connected to the cover panel 80. The link module 82 may further include a link bracket 92 that connects the second link 86 and the tub bracket 74, and a link holder 90 that connects the third link 88 and the cover panel 80.

Figure 4A:
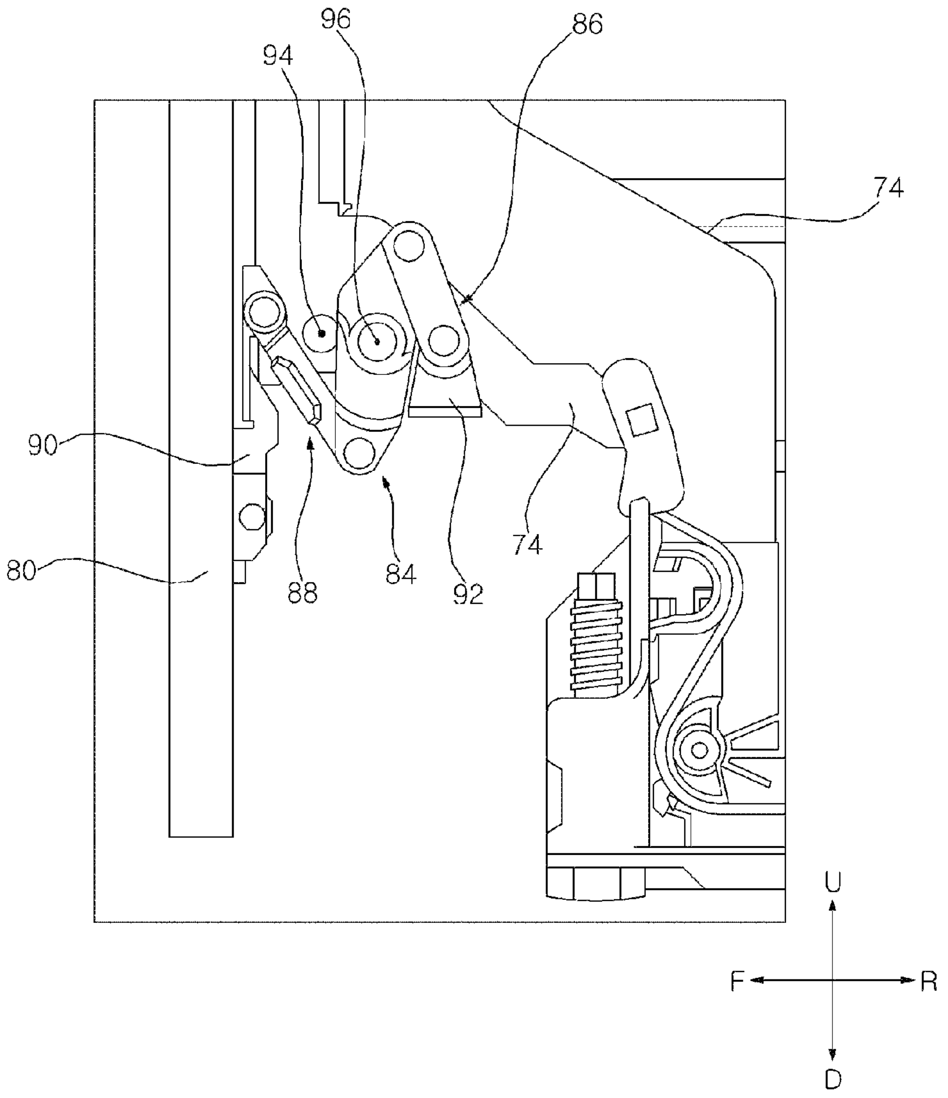
FIG. 4A is a view illustrating the arrangement of a link module with a door being closed, according to an embodiment of the present disclosure.
Figure 4B:
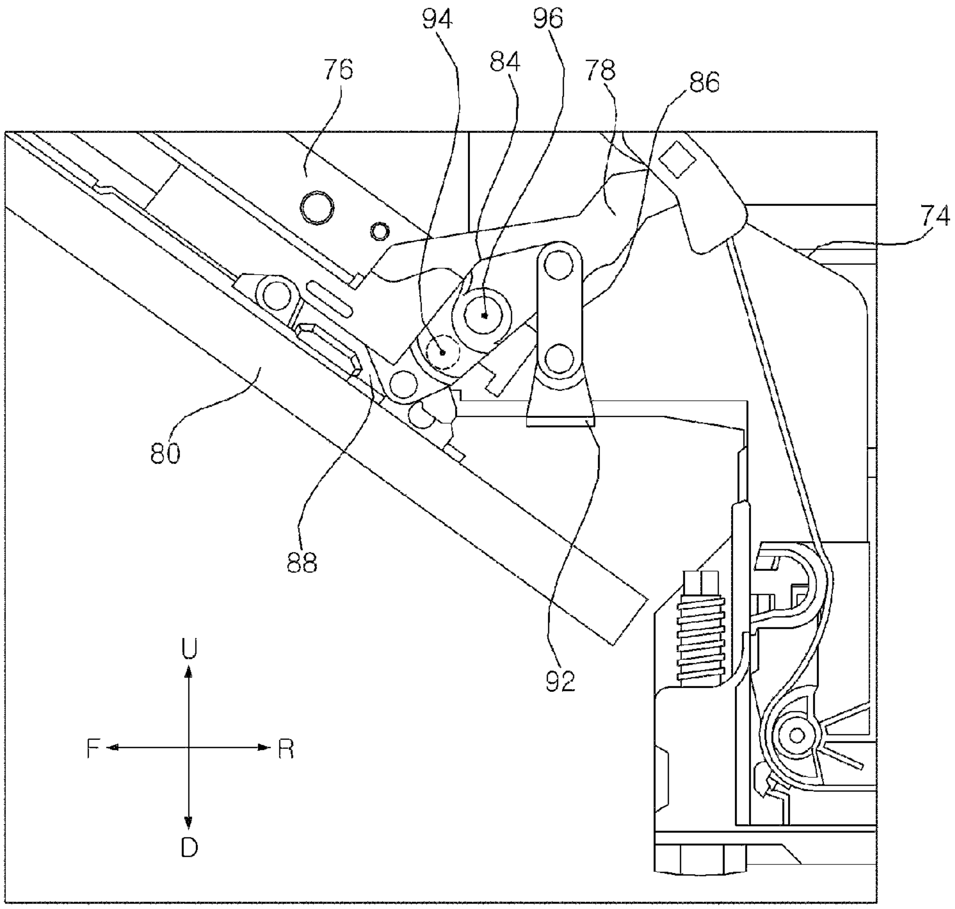
FIG. 4B is a view illustrating the arrangement of a link module with a door being open or closed, according to an embodiment of the present disclosure.
Figure 4C:
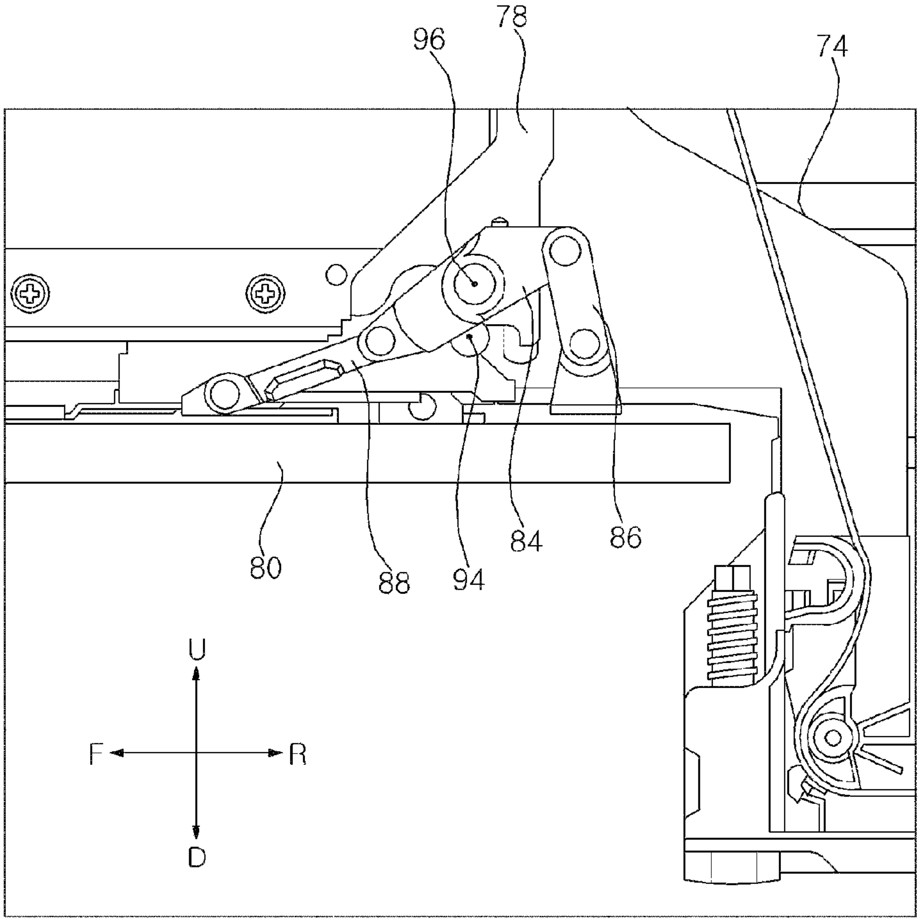
FIG. 4C is a view illustrating the arrangement of a link module with a door being fully open, according to an embodiment of the present disclosure.

Referring to FIGS. 4A to 4C, the arrangement of the link module 82 is changed according to rotation of the door 76, and the cover panel 80 that is movably disposed on the door 76 moves when the door 76 rotates.

When the door 76 is open, a link shaft 96 rotates counterclockwise as the door 76 rotates with respect to the door rotating shaft 94. The link shaft 96 moves from a rear side (R) of the door rotating shaft 94 to an upper side (U) of the door rotating shaft 94. The link shaft 96 moves when the door 76 is open, allowing the first link 84 to push the third link 88 forward. Accordingly, when the door 76 rotates, the cover panel 80 may move upward in the longitudinal direction (Lu) of the door by the third link 88.

Conversely, when the door 76 is closed, the link shaft 96 rotates clockwise as the door 76 rotates with respect to the door rotating shaft 94. The link shaft 96 moves from the upper side (U) of the door rotating shaft 94 to the rear side (R) of the door rotating shaft 94. The link shaft 96 moves when the door 76 is closed, allowing the first link 84 to pull the third link 88 rearward. Accordingly, when the door 76 rotates, the cover panel 80 may move downward in the longitudinal direction (Td) of the door by the third link 88.

The door 76 opens and closes the open front surface of the tub 10.

<Light source>

Hereinafter, the light source 100 of the present disclosure will be described with reference to FIGS. 5 to 9C.

The dishwasher 1 includes the light source 100 that is disposed on the lower cover 200 and emits light to the lower side of the lower cover 200. The light source 100 is disposed on the lower cover 200 to emit light toward a bottom or a floor under the lower cover 200. Light generated by the light source 100 passes through the light source holes 204*a*, 204*b*, 204*c*, 204*d*, 204*e*, and 204*f* formed in the lower cover 200 to be emitted to the floor under the lower cover 200. The light passes through the light source holes 204*a*, 204*b*, 204*c*, 204d, 204e, and 204f formed in the lower cover 200 to be emitted to only a partial area of the floor.

The light source 100 includes a plurality of lamps 122a, 122b, 122c, 122d, 122e, and 122f that emit light, a printed circuit board 120 on which the plurality of lamps 122a, 122b, 122c, 122d, 122e, and 122f for are mounted and configured to control the operation of the plurality of lamps 122a, 122b, 122c, 122d, 122e and 122f, and the housing 102 defining a space into which the printed circuit board 120 is inserted and in which the arrangement of the plurality of lamps 122a, 122b, 122c, 122d, 122e, 122f is fixed. The light source 100 further includes a plurality of indicator lamps 124a, 124b, 124c, and 124d that are disposed on the printed circuit board 120 and emit light of a different color from the plurality of lamps.

The plurality of lamps 122a, 122b, 122c, 122d, 122e, and 122f are spaced apart from one another at predetermined intervals in the left-and-right direction. In this embodiment, six lamps 122a, 122b, 122c, 122d, 122e, and 122f are provided, but the number of lamps may vary depending on a size of the door 76 or an irradiation angle of the lamp. A separation distance between the plurality of lamps 122a, 122b, 122c, 122d, 122e, and 122f may be set or determined according to a distance between the lamp and the light source hole 204a, 204b, 204c, 204d, 204e, 204f of the lower cover 200, a distance between the cover 200 and the floor, etc.

The plurality of lamps 122a, 122b, 122c, 122d, 122e, and 122f may be configured as LED lamps. The plurality of lamps 122a, 122b, 122c, 122d, 122e, 122f may each emit light in a range of 110 degrees to 130 degrees.

Figure 7A:
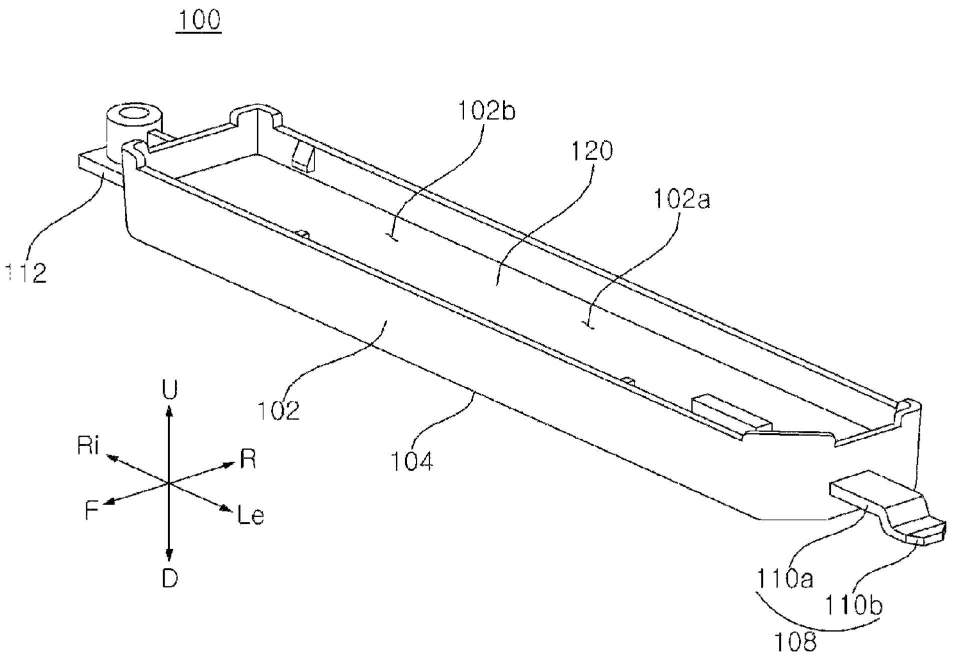
FIG. 7A is a perspective view of a light source according to an embodiment of the present disclosure.
Figure 7B:
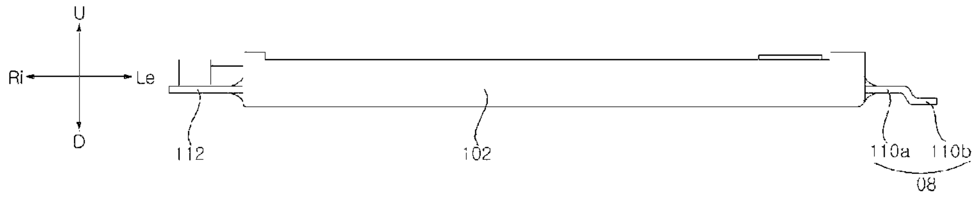
FIG. 7B is a front view of a light source according to an embodiment of the present disclosure.
Figure 7C:
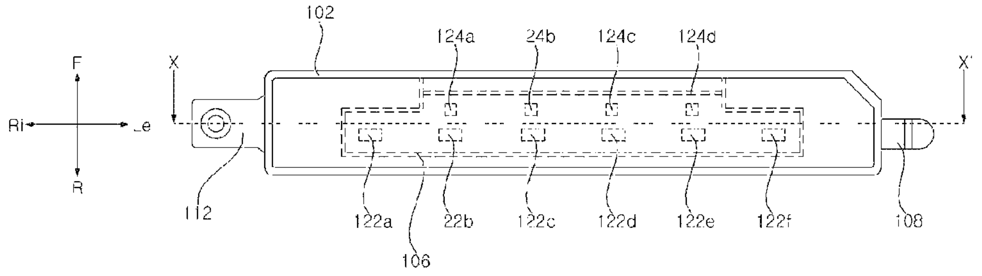
FIG. 7C is a bottom view of a light source according to an embodiment of the present disclosure.
Figure 7D:
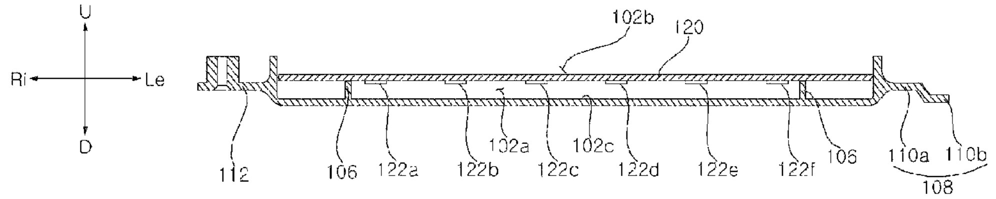
FIG. 7D is a cross-sectional view taken along the line X-X' of FIG. 7C.

The plurality of indicator lamps 124a, 124b, 124c, and 124d are disposed at the front of the plurality of lamps 122a, 122b, 122c, 122d, 122e, and 122f. An area of the floor to which the plurality of indicator lamps 124a, 124b, 124c, and 124d emit light is smaller than that of the plurality of lamps 122a, 122b, 122c, 122d, 122e, and 122f. The number of the plurality of indicator lamps 124a, 124b, 124c, and 124d may be less than or equal to the number of the plurality of lamps 122a, 122b, 122c, 122d, 122e, and 122f. Referring to FIG. 7C, in this embodiment, four indicator lamps 124a, 124b, 124c, and 124d may be provided. In other words, indicator lamps are not provided at the front of the outermost lamps 122a and 122f.

The plurality of indicator lamps 124a, 124b, 124c, and 124d may emit light of a color different from that of the plurality of lamps 122a, 122b, 122c, 122d, 122e, and 122f. The plurality of indicator lamps 124a, 124b, 124c, and 124d may emit light of a red color.

The plurality of lamps 122a, 122b, 122c, 122d, 122e and 122f, and the plurality of indicator lamps 124a, 124b, 124c, and 124d are arranged on the printed circuit board 120 in a longitudinal direction of the printed circuit board 120. The printed circuit board 120 may supply power to the plurality of lamps 122a, 122b, 122c, 122d, 122e and 122f, or the plurality of indicator lamps 124a, 124b, 124c and 124d, and may control the operation of the plurality of lamps 122a, 122b, 122c, 122d, 122e and 122f, or the plurality of indicator lamps 124a, 124b, 124c, and 124d.

The housing 102 defines an inner space 102a in which the printed circuit board 120 is disposed, and includes, at one side thereof, an opening 102b into which the printed circuit board 120 is inserted. A rib 106, which allows the printed circuit board 120 that is inserted into the housing 102 to be spaced apart from an inner surface of the housing 102 by a predetermined interval, is disposed at the inner space 102a of the housing 102. The rib 106 vertically protrudes upward from the inner surface 102c of the housing 102. The rib 106 may be disposed around the plurality of lamps 122a, 122b, 122c, 122d, 122e, and 122f disposed on the printed circuit board 120. A protruding height 106h of the rib 106 may be determined in consideration of irradiation angles of the plurality of lamps 122a, 122b, 122c, 122d, 122e, and 122f.

The housing 102 may be made of a transparent material, so that light generated from the plurality of lamps 122a, 122b, 122c, 122d, 122e, and 122f disposed at the inner space 102a is emitted to the outside.

The housing 102 includes at least one coupling part 108, 112 to be fixed to the lower cover 200. Referring to FIG. 7A, the housing 102 includes an accommodation part 104 in which the printed circuit board 120 is accommodated, the mounting part 108 formed at one end of the accommodation part 104 in the left-and-right direction, and the fastening part 112 formed at another end of the accommodation part 104 and fastened to the lower cover 200.

Referring to FIG. 7A, the coupling part 108, 112 may be configured as the mounting part 108 and the fastening part 112. However, this is only one example, and mounting parts may be disposed at opposite ends of the housing 102 or fastening parts may be disposed at opposite ends of the housing 102. Alternatively, additional coupling parts may be disposed in other directions other than the left and right ends.

The mounting part 108 protrudes from one end portion of the accommodation part 104. A portion of the mounting part 108 is inserted into the lower cover 200 to allow the housing 102 to be disposed on an upper side of the lower cover 200. A portion of the mounting part 108 is inserted into the first fixing part 206 of the lower cover 200 to thereby fix one side of the accommodating part 104. The mounting part 108 includes a first extension portion 110a that extends from one end portion of the accommodation part 104 and a second extension portion 110b that extends downwardly apart from an end of the first extension portion 110a.

The second extension portion 110b is inserted into the insertion hole 208 of the first fixing part 206 formed in the lower cover 200.

The fastening part 112 protrudes from another end portion of the accommodation part 104. The fastening part 112 is fastened to the second fixing part 210 of the lower cover 200 by a separate fastening member (not shown).

As the mounting part 108 is inserted into the first fixing part 206 of the lower cover 200, and the fastening part 112 is fastened to the second fixing part 210 of the lower cover 200, the light source 100 may be fixedly disposed on the upper side of the lower cover 200.

With the printed circuit board 120 mounted to the inner space 102a of the housing 102, silicone is molded to thereby cover an upper side of the printed circuit board 120. With the printed circuit board 120 mounted to the inner space 102a of the housing 102, silicone is molded into the opening of the housing 102.

As silicone is molded onto the printed circuit board 120 that is disposed at the inner space 102a, the placement of the printed circuit board 120 may be fixed, and the printed circuit board 120 may be prevented from being exposed to external moisture.

<Arrangement Relations>

Hereinafter, a relationship between arrangements of the configuration of the light source 100 and the configuration of the lower cover 200 will be described with reference to FIGS. 9A to 11. Some of the plurality of lamps, some the plurality of indicator lamps, and some of the plurality of light source holes are only used for description in FIGS. 9C to 11, but it may be equally applied to the remaining lamps, indicator lamps, and light source holes that are not shown in the drawings.

Light emitted from the plurality of lamps 122*a*, 122*b*, 122*c*, 122*d*, 122*e*, and 122*f* illuminates a portion of a bottom or floor in a space between the cover panel 80 and the base 70. When the light illuminates the entire area of the space between the cover panel 80 and the base 70, an area that is difficult to keep clean and maintain is also illuminated. Light generated from the plurality of lamps 122*a*, 122*b*, 122*c*, 122*d*, 122*e*, and 122*f* of the present disclosure passes through the plurality of light source holes 204*a*, 204*b*, 204*c*, 204*d*, 204*e*, and 204*f*, thereby illuminating only a limited area of the floor under the lower cover 200.

Light emitted from the plurality of lamps 122*a*, 122*b*, 122*c*, 122*d*, 122*e*, and 122*f* passes through the plurality of light source holes 204*a*, 204*b*, 204*c*, 204*d*, 204*e*, and 204*f* formed in the lower cover 200 to illuminate the floor. The light emitted from the respective plurality of lamps 122*a*, 122*b*, 122*c*, 122*d*, 122*e*, 122*f* passes through the respective plurality of lamps 122*a*, 122*b*, 122*c*, 122*d*, 122*e*, and 122*f*, which correspond to the plurality of lamps 204*a*, 204*b*, 204*c*, 204*d*, 204*e*, and 204*f*, respectively. The light emitted from each of the plurality of lamps 122*a*, 122*b*, 122*c*, 122*d*, 122*e*, and 122*f* does not pass through the light source hole disposed under the different lamps. That is, light overlapped by the plurality of lamps 122*a*, 122*b*, 122*c*, 122*d*, 122*e*, and 122*f* on the upper side of the lower cover 200 does not pass through the light source hole.

The plurality of light source holes 204*a*, 204*b*, 204*c*, 204*d*, 204*e*, and 204*f* are spaced apart from one another at the same interval as the plurality of lamps 122*a*, 122*b*, 122*c*, 122*d*, 122*e*, and 122*f*. The plurality of lamps 122*a*, 122*b*, 122*c*, 122*d*, 122*e*, and 122*f* are disposed to be spaced apart from the plurality of light source holes 204*a*, 204*b*, 204*c*, 204*d*, 204*e*, and 204*f* by a predetermined interval.

Light irradiated from one lamp is emitted to the outside only through the light source hole formed under the lamp. Referring to FIG. 10B, light generated from the lamp 122*a* and the lamp 122*b* is emitted downward through the respective light source holes 204*a* and 204*b* of the lower cover 200, which are disposed under the lamps 122*a* and 122*b*, respectively. That is, the light generated from the first lamp 122*a* passes through the first light source hole 204*a* to be emitted downward and does not pass through the second light source hole 204*b*. Similarly, the light generated from the second lamp 122*b* passes through the second light source hole 204*b* to be emitted downward and does not pass through the first light source hole 204*a*. Accordingly, a separation distance L between adjacent lamps, and a separation distance H1 between the lamp and the light source may be set or determined in consideration of an irradiation angle of the lamp.

The separation distance L between the plurality of lamps 122*a*, 122*b*, 122*c*, 122*d*, 122*e*, and 122*f* may be adjusted such that light emitted from one lamp does not pass through a light source hole formed under another lamp.

Referring to FIG. 10B, a light area 8 emitted from the lamp may be formed in a range of 110 to 130 degrees. A separation distance L between one lamp and another lamp disposed adjacent to each other is greater than a distance H1 between the lamp and the light source hole. The separation distance L between one lamp and another lamp disposed adjacent to each other may be greater than or equal to three times the distance H1 between the lamp and the light source hole.

Figure 10A:
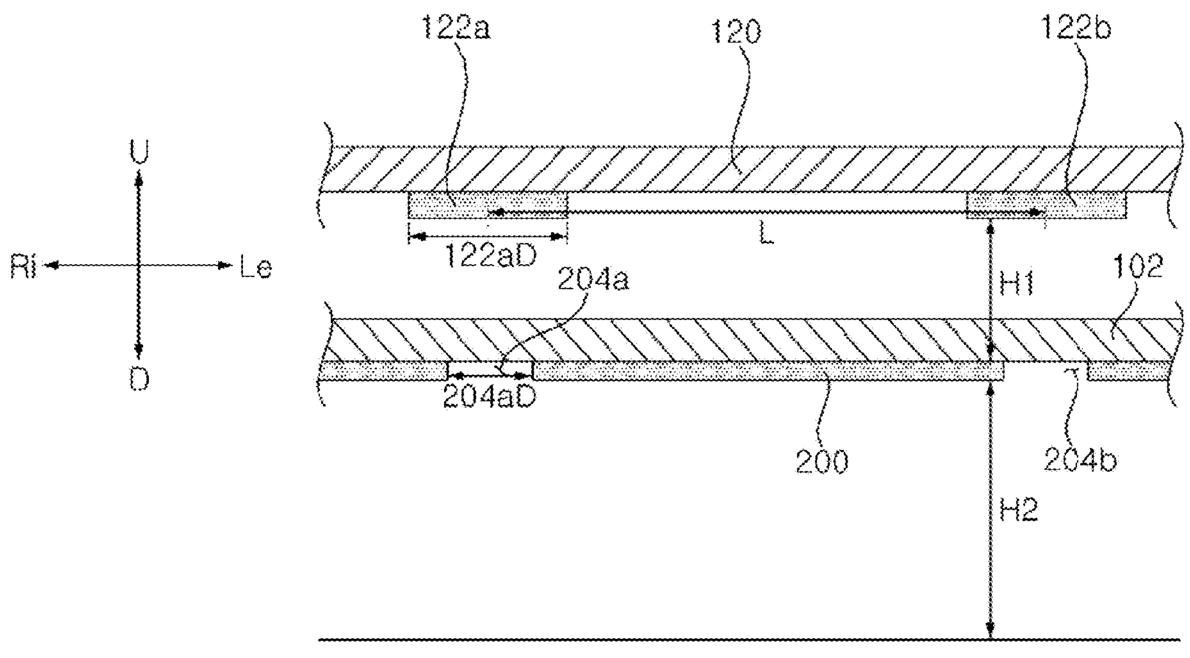
FIG. 10A is a view illustrating the arrangement of a lamp and a light source hole, according to an embodiment of the present disclosure.
Figure 10B:
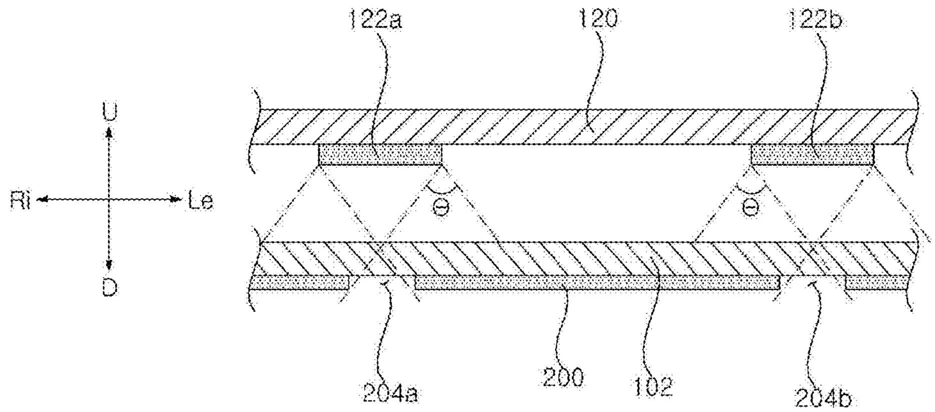
FIG. 10B is a view illustrating the relationship between light emitted from a lamp and a light source hole, according to an embodiment of the present disclosure.
Figure 11:
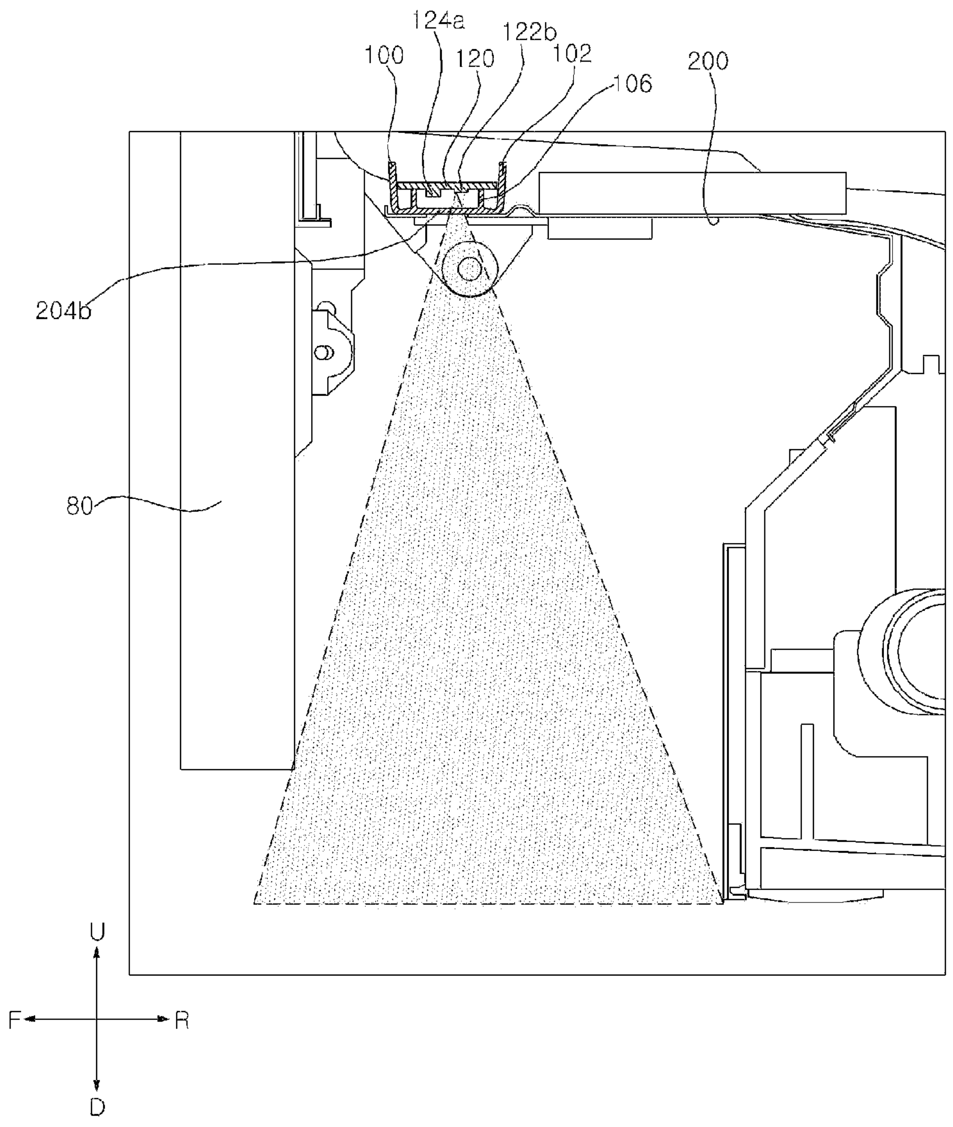
FIG. 11 is a view illustrating the relationship among light emitted from a lamp, a light source hole, a lower side of a lower cover, and a cover panel, according to an embodiment of the present disclosure.
Figure 13A:
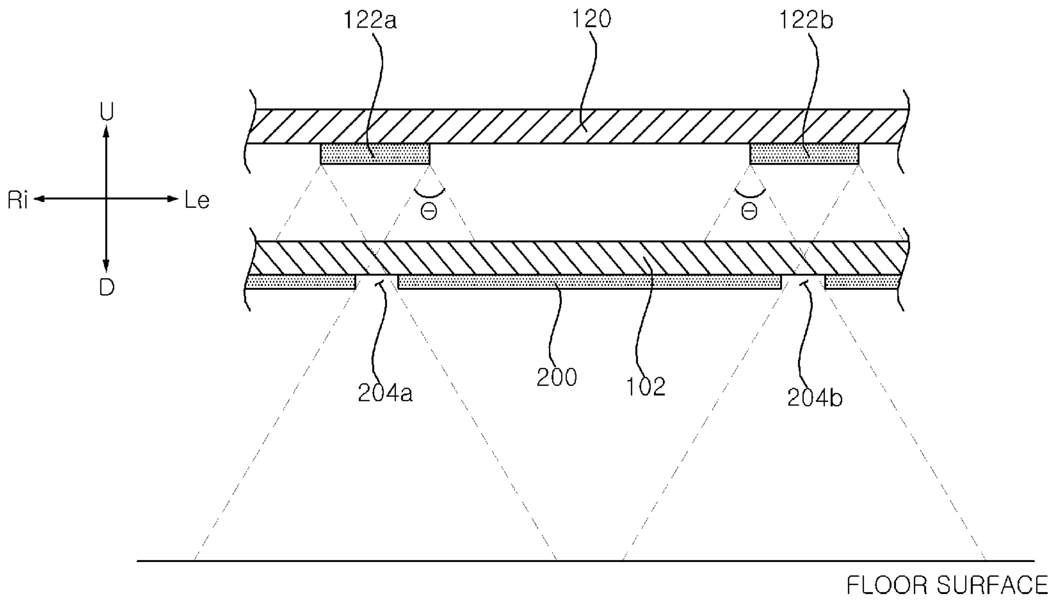
FIG. 13A is a view illustrating a state in which light emitted from a plurality of lamps in FIG. 10A illuminates a floor.
Figure 13B:
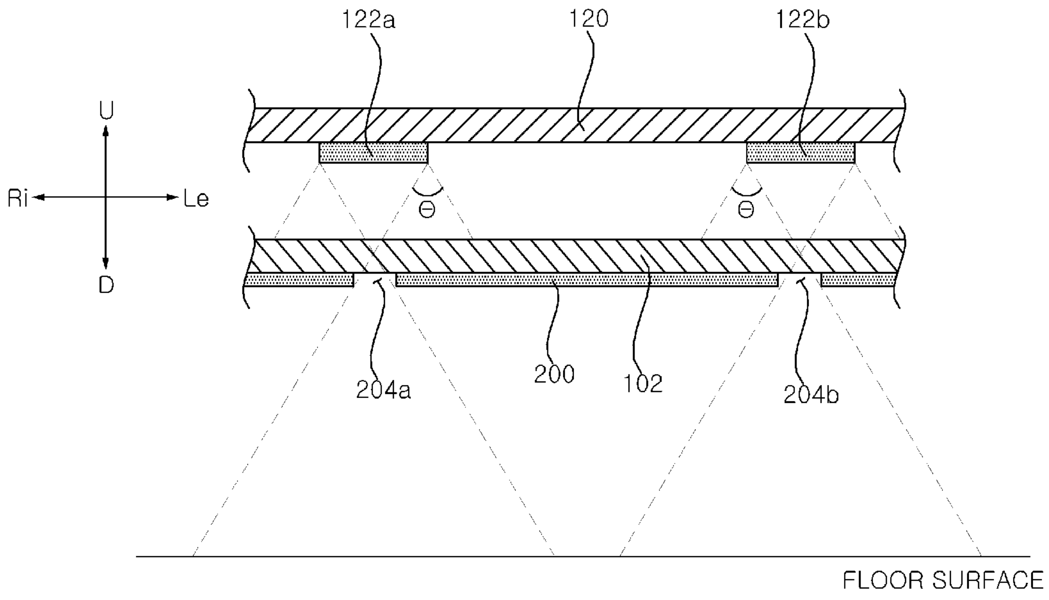
FIG. 13B is a view of a comparative example of FIG. 13A.

Referring to FIG. 10A, a distance H1 between the lamp and the light source hole is less than a distance H2 from the lower cover 200 where the light source hole is formed to the floor. The distance H2 from the lower cover 200 to the floor shown in FIGS. 10A, 13A, and 13B is merely for illustration purpose only. In fact, the distance H2 from the lower cover 200 to the floor may be greater than or equal to 10 times the distance H1 between the lamp and the light source hole as shown in FIG. 11.

Considering an overlapping degree of light emitted to the floor, a distance H1 from the lamp 122*a* to the light source hole 202*a*, a length 204*a* D of the light source hole 202*a* in the left-and-right direction, or a distance H2 from the lower cover 200 to the floor surface may be determined.

Figure 12:
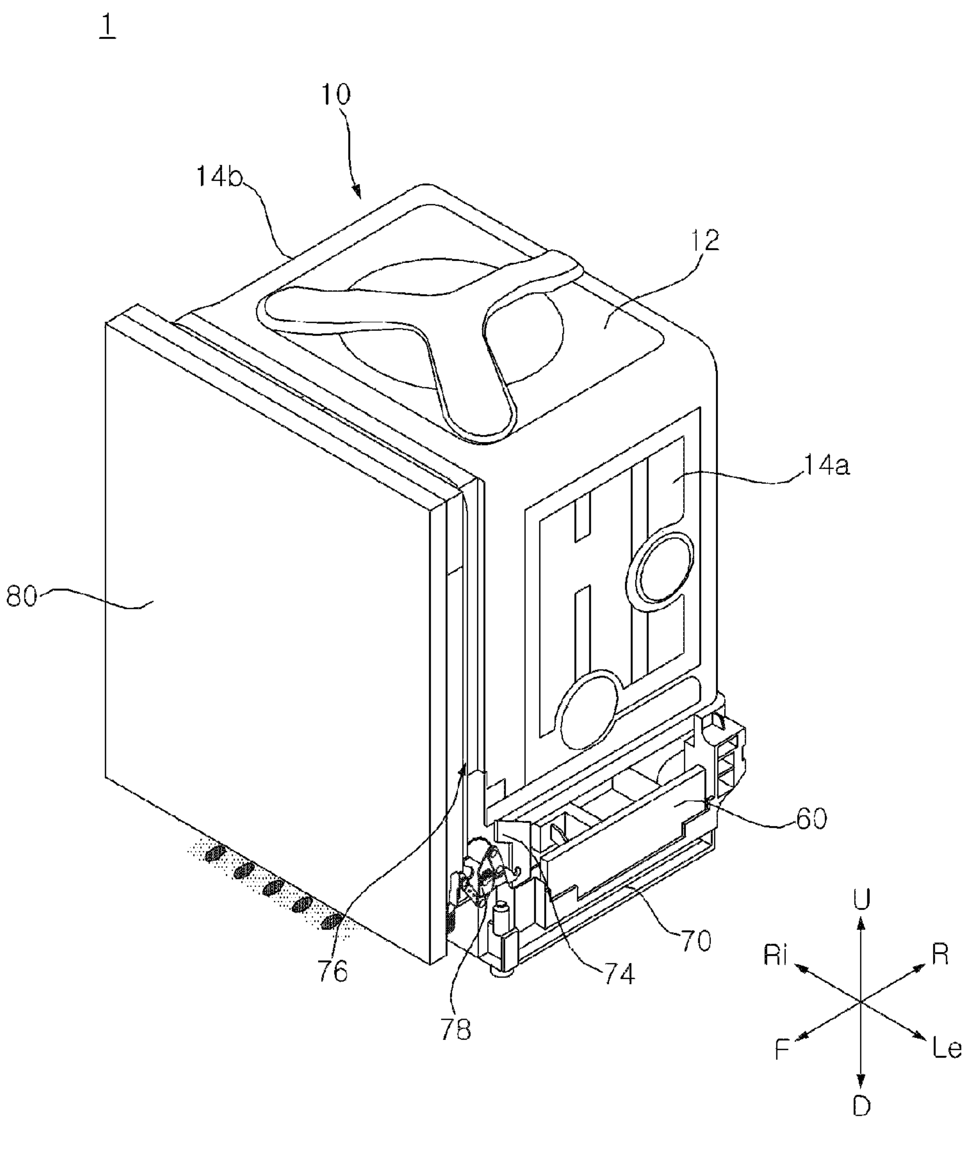
FIG. 12 is a perspective view of a dishwasher with a plurality of lamps being turned on, according to an embodiment of the present disclosure.

That is, referring to FIG. 10A, when the distance H2 from the lower cover 200 to the floor surface is constant, according to the length 204*a* D of the light source hole 202*a* in the left-and-right direction, light emitted from the plurality of lamps 122*a* and 122*b* may overlap each other as shown in FIG. 13A, or may not overlap each other as shown in FIG. 13B. The length 204*a* D of the light source hole 202*a* in the left-and-right direction according to the present disclosure may be formed such that light emitted from the lamp 122*a* and light emitted from the lamp 122*b* partially overlap each other. In this case, as shown in FIG. 12, one long light in the left-and-right direction can be seen when viewed by a user, thereby enhancing aesthetics.

In addition, when the distance H2 from the lower cover 200 to the floor surface is constant, the distance H1 from the lamp 122*a* to the light source hole 202*a* is adjusted to make light emitted from the lamp 122*a* and light emitted from the lamp 122*b* overlap each other, as shown in FIG. 13A.

Referring to FIG. 10A, the length 204*a* D of the light source hole 202*a* in the left-and-right direction is less than a length 122*a* D of the lamp 122*a* in the left-and-right direction. A length 202*a* D of the light source hole 204*a* in the left-and-right direction is greater than or equal to 0.5 times and less than one time the length 122*a* D of the lamp 122*a* in the left-and-right direction.

Figure 9A:
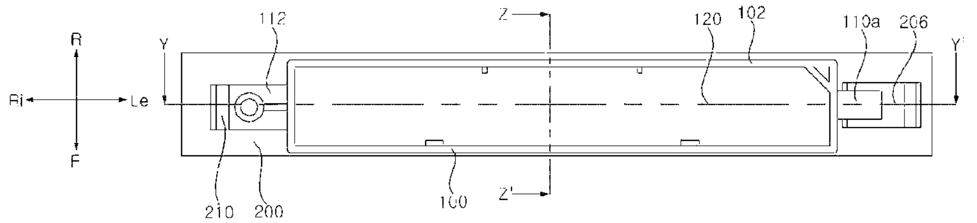
FIG. 9A is a plan view illustrating a state in which a light source is mounted on a lower cover, according to an embodiment of the present disclosure.
Figure 9B:
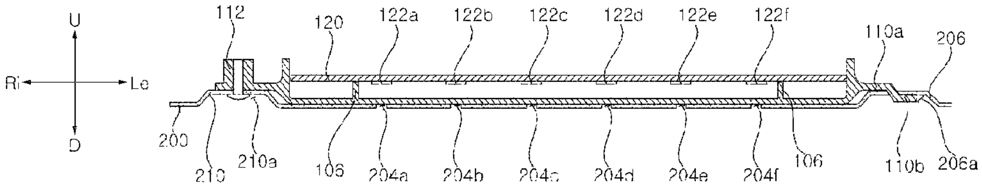
FIG. 9B is a cross-sectional view taken along the line Y-Y' of FIG. 9A.
Figure 9C:
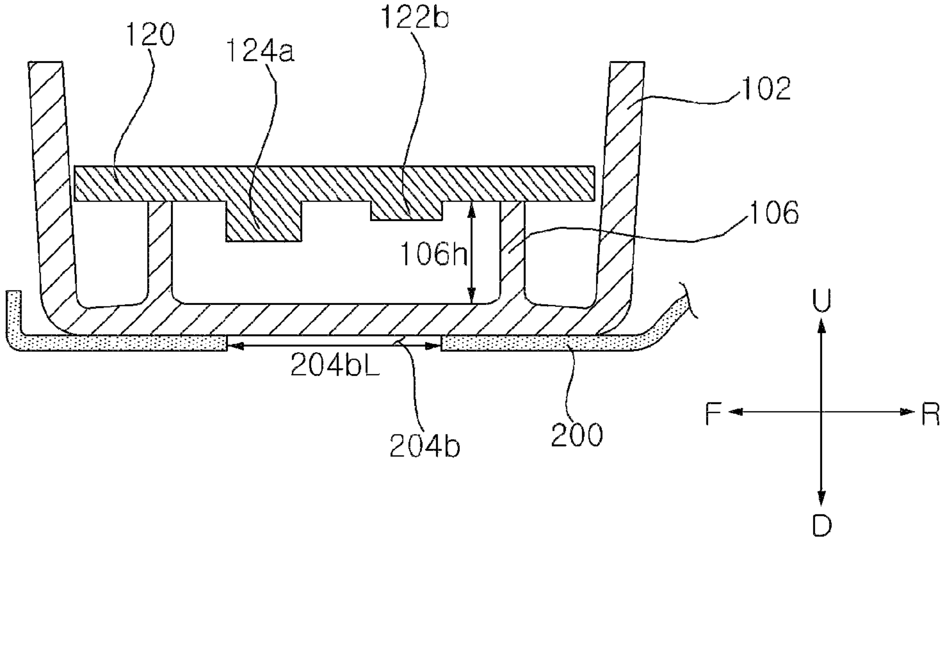
FIG. 9C is a cross-sectional view taken along the line Z-Z' of FIG. 9A.

Referring to FIG. 9C, the lamp 122*b* is disposed at the rear of the indicator lamp 124*a*. Referring to FIG. 9A, the lamp 122*b* and the indicator lamp 124*a* are disposed in a front-and-rear direction of the printed circuit board 120. Accordingly, light emitted from the indicator lamp 124*a* may be emitted to a more rearward area of the floor surface in relation to light emitted from the lamp 122*b*. The indicator lamp 124*a* may be disposed to protrude more downward than the lamp 122*b*.

Referring to FIG. 9C, the length 204*b* L of the light source hole 204*b* in the front-and-rear direction is less than or equal to a distance from a front end of the indicator lamp 124*a* to a rear end of the lamp 122*b*.

Referring to FIG. 11, the lamp 122*b* may be disposed such that light is emitted to a lower side of the cover panel 80. The lamp 122*b* may adjust a light divergence angle of the lamp to allow light to be emitted to the lower side of the cover panel 80. In the lamp 122*b*, light emitted forward from the lamp 122*b* does not interfere with the light source hole, so that light is emitted to the lower side of the cover panel 80.

In the present disclosure, the plurality of lamps are provided, light interference between the lamps are minimized, and excessive light diffusion into an undesired space is prevented by setting the separation distance L between adjacent lamps, the separation distance H1 between the lamp and the light source hole, the distance H2 from the lower cover 200 to the floor surface, and the length 204*a* D of the light source hole 202*a* in the left-and-right direction. That is, the distances are set to minimize light of the lamp 122*a* from passing through the light source hole 204*b* rather than passing through the light source hole 204*a*, and to allow light passing through the respective light source holes to be emitted only on a desired surface of the floor.

Each of the lamps may be controlled by a partial overlap of light as shown in FIGS. 12 and 13A, thereby easily producing light effects such as dimming lighting technology. In addition, the current operating status of the dishwasher may be informed using the light effects. As the light source holes 204*a*, 204*b*, 204*c*, 204*d*, 204*e*, and 204*f* that respectively correspond to the lamps 122*a*, 122*b*, 122*c*, 122*d*, 122*e*, and 122*f* are provided, a possibility of inflow of foreign matter may be reduced compared when a single large hole is drilled.

Although preferred embodiments of the present disclosure have been shown and described herein, the present disclosure is not limited to the specific embodiments described above. It will be understood that various modifications and changes can be made by those skilled in the art without departing from the idea and scope of the present disclosure as defined by the appended claims. Therefore, it shall be considered that such modifications, changes, and equivalents thereof are all included within the scope of the present disclosure.

The invention claimed is:

1. A dishwasher comprising:

a tub that defines a space configured to receive objects to be washed, the tub having an open side;

a base that is disposed below the tub and supports the tub at a portion spaced apart from a floor surface;

a door configured to open and close the open side of the tub;

a lower cover that extends forward from a front end of the base and is disposed below the tub; and a light source disposed above the lower cover and configured to emit light, wherein the light source comprises:

a housing, a plurality of lamps that are disposed at the housing, that are spaced apart from one another, and that are configured to emit light, the plurality of lamps being spaced apart from the lower cover in a vertical direction, and a printed circuit board that supports the plurality of lamps and is configured to control operation of the plurality of lamps, wherein the housing comprises a rib that defines a space between the printed circuit board and a surface of the housing, and wherein the lower cover defines a light source hole that is open to a lower side of the lamp.

2. The dishwasher of claim 1, wherein the lower cover defines a plurality of light source holes at positions below the plurality of lamps, the plurality of light source holes including the light source hole.

3. The dishwasher of claim 2, wherein each of the plurality of light source holes is defined at the position below one of the plurality of lamps.

4. The dishwasher of claim 3, wherein the lower cover comprises an interval portion that is disposed between the plurality of light source holes and configured to block light emitted from the plurality of lamps such that the light emitted from the plurality of lamps passes through the plurality of light source holes, respectively.

5. The dishwasher of claim 3, wherein an interval between the plurality of lamps is greater than a separation distance between each of the plurality of lamps and the corresponding light source hole.

6. The dishwasher of claim 3, wherein an interval between the plurality of lamps is three times greater than a separation distance between each of the plurality of lamps and the corresponding light source hole.

7. The dishwasher of claim 3, wherein a length of each of the plurality of lamps in a left-and-right direction is greater than a length of each of the plurality of light source holes in the left-and-right direction.

8. The dishwasher of claim 3, wherein the plurality of light source holes are configured to transmit light from the plurality of lamps to the floor surface below the lower cover.

9. The dishwasher of claim 1, further comprising a cover panel disposed on the door and configured to move relative to the door, wherein the light source is configured to emit light to a space between the cover panel and the base.

10. The dishwasher of claim 1, wherein the housing is made of a transparent material.

11. The dishwasher of claim 1, wherein the light source further comprises silicone that is disposed in an inner space of the housing and covers an upper side of the printed circuit board in the inner space of the housing.

12. The dishwasher of claim 1, wherein the light source further comprises an indicator that is disposed on the printed circuit board and configured to emit light having a color different from a color of light emitted from the plurality of lamps.

13. The dishwasher of claim 12, wherein the light source further comprises a plurality of indicators that include the indicator and are disposed at front sides of the plurality of lamps.

14. The dishwasher of claim 12, wherein a length of the light source hole in a front-and-rear direction is less than or equal to a distance from a front end of the indicator to a rear end of the plurality of lamps.

15. The dishwasher of claim 1, wherein the housing covers the light source hole and is configured to transmit light emitted from the plurality of lamps to the light source hole, and wherein the light source hole is configured to transmit light from the housing to the floor surface.

16. The dishwasher of claim 1, wherein the housing has:

an upper wall, the plurality of lamps being disposed at a lower side of the upper wall; and a lower wall that is spaced apart from the upper wall in the vertical direction and faces the upper wall, the lower cover being in contact with a lower side of the lower wall.

17. The dishwasher of claim 16, wherein the lower wall of the housing covers the light source hole and is configured to transmit light emitted from the plurality of lamps.

18. The dishwasher of claim 1, wherein a distance from the lower cover to the floor surface is greater than or equal to ten times of a distance between the light source hole and the plurality of lamps.

19. A dishwasher comprising:

a tub that defines a space configured to receive objects to be washed, the tub having an open side;

a base that is disposed below the tub and supports the tub at a portion spaced apart from a floor surface;

a door configured to open and close the open side of the tub;

a lower cover that extends forward from a front end of the base and is disposed below the tub; and a light source disposed at the lower cover and configured to emit light, wherein the light source comprises:

a housing, and a plurality of lamps that are disposed at the housing, that are spaced apart from one another, and that are configured to emit light, the plurality of lamps being spaced apart from the lower cover in a vertical direction, wherein the lower cover defines a plurality of light source holes at positions below the plurality of lamps, and wherein each of the plurality of light source holes is defined at the position below one of the plurality of lamps.

20. A dishwasher comprising:

a tub that defines a space configured to receive objects to be washed, the tub having an open side;

a base that is disposed below the tub and supports the tub at a portion spaced apart from a floor surface;

a door configured to open and close the open side of the tub;

a lower cover that extends forward from a front end of the base and is disposed below the tub; and a light source disposed at the lower cover and configured to emit light, wherein the light source comprises:

a housing, and a lamp disposed at the housing and configured to emit light, the lamp being spaced apart from the lower cover in a vertical direction, wherein the lower cover defines a light source hole that is open to a lower side of the lamp, and wherein the housing has:

an upper wall, the lamp being disposed at a lower side of the upper wall, and a lower wall that is spaced apart from the upper wall in the vertical direction and faces the upper wall, the lower cover being in contact with a lower side of the lower wall.

* * * * *